United States Patent
Regli et al.

(10) Patent No.: US 10,599,789 B2
(45) Date of Patent: Mar. 24, 2020

(54) TOPOGRAPHY SIMULATION OF ETCHING AND/OR DEPOSITION ON A PHYSICAL STRUCTURE

(71) Applicant: Synopsys, Inc., Mountain View, CA (US)

(72) Inventors: Peter Regli, Aarepark (CH); Giovanni Bozza, Paradiso (CH)

(73) Assignee: Synopsys, Inc., Mountain View, CA (US)

( * ) Notice: Subject to any disclaimer, the term of this patent is extended or adjusted under 35 U.S.C. 154(b) by 292 days.

(21) Appl. No.: 15/360,568

(22) Filed: Nov. 23, 2016

(65) Prior Publication Data

US 2017/0147724 A1    May 25, 2017

Related U.S. Application Data

(60) Provisional application No. 62/260,102, filed on Nov. 25, 2015.

(51) Int. Cl.
*G06F 17/50* (2006.01)
*H01L 21/027* (2006.01)

(52) U.S. Cl.
CPC ........ *G06F 17/5009* (2013.01); *H01L 21/027* (2013.01); *G06F 2217/10* (2013.01); *G06F 2217/12* (2013.01)

(58) Field of Classification Search
CPC ............. G06F 17/5009; G06F 2217/16; G06F 2217/10; G06F 2217/12; H01J 2237/206; H01L 21/027
USPC ...................................................... 703/2, 13
See application file for complete search history.

(56) References Cited

U.S. PATENT DOCUMENTS

| | | | | |
|---|---|---|---|---|
| 2005/0238254 A1* | 10/2005 | Guhring | ............... | G06T 3/0075 382/294 |
| 2014/0005990 A1* | 1/2014 | Kuboi | ................ | G06F 17/5009 703/2 |
| 2014/0129203 A1* | 5/2014 | Kuboi | ................ | G06F 17/5009 703/14 |

OTHER PUBLICATIONS

Ertl, Otmar, and Siegfried Selberherr. "Three-dimensional level set based Bosch process simulations using ray tracing for flux calculation." Microelectronic Engineering 87.1 (2010). pp. 20-29. (Year: 2010).*

Amanatides, John, and Andrew Woo. "A fast voxel traversal algorithm for ray tracing." Eurographics. vol. 87. No. 3. 1987. pp. 1-6. (Year: 1987).*

Ertl, Otmar, and Siegfried Selberherr. "Three-dimensional level set based Bosch process simulations using ray tracing for flux calculation." Microelectronic Engineering 87.1 (2010). pp. 20-29. (Year: 2010).*

(Continued)

*Primary Examiner* — Kamini S Shah
*Assistant Examiner* — John E Johansen
(74) *Attorney, Agent, or Firm* — Park, Vaughan, Fleming & Dowler LLP; Laxman Sahasrabuddhe (57) ABSTRACT

Systems and techniques are described for topography simulation of etching and/or deposition on a physical structure. The structural information can be represented using a three-dimensional (3D) voxel grid data structure. For each particle emitted by a Monte-Carlo particle emission model, a topographical modification caused by the particle can be determined by (1) calculating fluxes, (2) evaluating surface reactions, and (3) modifying the physical structure. The effect of the etching and/or deposition on a physical structure can be displayed by rendering the 3D voxel grid data structure.

12 Claims, 6 Drawing Sheets

(56) References Cited

OTHER PUBLICATIONS

Amanatides, John, and Andrew Woo. "A fast voxel traversal algorithm for ray tracing." Eurographics. vol. 87. No. 3. 1987. pp. 1-6. (Year: 1987).*

Definition of Voxel by Merriam-Webster. Access May 16, 2019. pp. 2-3. https://www.merriam-webster.com/dictionary/voxel (Year: 2019).*

John Amanatides et al. "A Fast Voxel Traversal Algorithm for Ray Tracing", retrieved from https://www.researchgate.net/publication/2611491_A_Fast_Voxel_Traversal_Algorithm_for_Ray_Tracing/download on Feb. 8, 2019.

* cited by examiner

TOPOGRAPHY SIMULATION OF ETCHING AND/OR DEPOSITION ON A PHYSICAL STRUCTURE

RELATED APPLICATION

This application claims benefit of U.S. Provisional Application Ser. No. 62/260,102, filed on 25 Nov. 2015, by the same inventors, the contents of which are herein incorporated by reference in their entirety for all purposes.

BACKGROUND

Technical Field

This disclosure relates to topography simulation. More specifically, this disclosure relates to topography simulation of etching and/or deposition on a physical structure.

Related Art

Advances in process technology and an almost insatiable appetite for consumer electronics have fueled a rapid increase in the size and complexity of IC designs. This dramatic increase in complexity and integration densities can be attributed to the improvements in IC design and manufacturing technologies which have made it possible to integrate tens of millions of devices onto a single chip.

As semiconductor integration densities continue to increase, accurately predicting the shapes and sizes of features on the silicon wafer's surface is becoming increasingly important. Inaccuracies in topography simulation can negatively affect the efficacy of downstream applications. Moreover, if the topography simulation is computationally inefficient, it can increase the time-to-market for an integrated circuit, which can cost millions of dollars in lost revenue. Hence, it is desirable to improve the accuracy and the efficiency of topography simulation.

SUMMARY

Some embodiments described herein feature systems and techniques for topography simulation of etching and/or deposition on a physical structure. Some embodiments can begin by initializing a three-dimensional (3D) voxel grid data structure that represents a volume containing the physical structure, wherein each voxel in the 3D voxel grid data structure stores a value that represents an amount of material in a 3D region corresponding to the voxel. In some embodiments, each voxel in the 3D voxel grid data structure stores an integer value. Specifically, if an b-bit integer value is used, then the value stored in each voxel can represent the fraction of the 3D region (e.g., a unit cube) that is filled with material, e.g., if the value n is stored in a voxel, where $0 \leq n \leq (2^b-1)$, then this can mean that $n2^b-1$ of the 3D region is filled with material, and the remainder of the 3D region is empty.

Next, for each particle emitted by a Monte-Carlo particle emission model, the embodiments can perform a set of operations to determine a topographical modification caused by the particle, wherein the set of operations comprises: (1) calculating a flux contribution of the particle at a location on a surface of the physical structure where the particle impacts the physical structure, wherein an impacted voxel in the 3D voxel grid data structure corresponds to the location where the particle impacts the surface of the physical structure; (2) evaluating surface reactions at the location on the surface of physical structure based on the flux contribution to obtain a value modification, wherein the value modification corresponds to an amount of material that is etched or deposited at the location on the surface of the physical structure because of the particle; and (3) using the value modification to update values stored in the impacted voxel and potentially other voxels in proximity to the impacted voxel. In some embodiments, calculating the flux contribution of the particle comprises using a voxel traversal technique to determine the location on the surface of the physical structure where the particle impacts the physical structure.

After the above-mentioned set of operations is performed for all of the particles emitted by the Monte-Carlo particle emission model, the resulting 3D voxel grid data structure represents the overall topographical effect that the emitted particles had on the physical structure. Next, the embodiments can display an image of the physical structure on a screen by rendering the 3D voxel grid data structure. In some embodiments, the displayed image can simulate the result of performing plasma-assisted deposition and/or etching on a wafer's surface during semiconductor manufacturing.

In some embodiments, the topography simulation is performed by using multiple threads in the computer that execute in parallel, wherein each thread performs the set of operations for a subset of particles emitted by the Monte-Carlo particle emission model. The multiple threads can share the 3D voxel grid data structure and do not obtain a lock for a voxel before modifying the value stored in the voxel.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

Overview of IC Design and Manufacturing

IC design software tools can be used to create an IC design. Once the IC design is finalized, it can undergo fabrication, packaging, and assembly to produce IC chips. The overall IC design and manufacturing process can involve multiple actors, e.g., one company may create the software for designing ICs, another company may use the software to create the IC design, and yet another company may manufacture IC chips based on the IC design. An IC design flow can include multiple steps, and each step can involve using one or more IC design software tools. An improvement to any one of the steps in the IC design flow results in an improvement to the overall IC design and manufacturing process. Specifically, the improved IC design and manufacturing process can produce IC chips with a shorter time-to-market (TTM) and/or higher quality of results (QoR). Some examples of IC design steps and the associated software tools are described below. These examples are for illustrative purposes only and are not intended to limit the embodiments to the forms disclosed.

Some IC design software tools enable IC designers to describe the functionality that the IC designers want to implement. These tools also enable IC designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence with the HDL code. Some embodiments described herein provide tools that can be used for synthesizing a clock tree during synthesis and design for test.

During design planning, an overall floorplan for the chip can be constructed and analyzed for timing and top-level routing. During physical implementation, circuit elements can be positioned in the layout and can be electrically coupled.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Overview

Plasma-assisted etching and/or deposition processes are key steps in the fabrication of semiconductor devices. Their purpose is to realize a three-dimensional structure consisting of different materials by a sequence of steps that add material (deposition) or remove material (etching). Physics-based topography simulation models these processes and helps us to understand, control, and optimize the etching and/or deposition processes. Due to the complex nature of the processes, and the fact that the etched or deposited structure evolves over time, existing topography simulation techniques are computationally expensive and tend to be limited in value due to their high computational cost and the long turn-around time for a simulation.

Embodiments described herein substantially speedup the simulation (e.g., by a factor of 100×-1000×) by using one or more of the following features:

1. Structure representation in a 3D cellular grid (voxel grid). In this disclosure, the term "cell" and "voxel" is used interchangeably. The structural information of the simulation model is represented in a 3D cellular grid (voxel grid), which is very similar to the representation of a two-dimensional (2D) image by using a 2D cellular grid (pixel grid). This data representation allows us to do structural modifications in a fast and robust way. In the context of this disclosure, an important, novel, and non-obvious feature is that the flux calculation is also implemented on the same 3D cellular grid data structure that is used for representing the structural information.

2. Discrete Volume-of-Fluid (VoF) method for tracking structure evolution. The VoF method is used in computational fluid dynamics. One of its main characteristics is the representation of different materials in terms of their volume fractions in the cells of a rectangular grid. A particular feature of embodiments described herein is that the volume fractions are described by integer numbers which represent discrete particles, or virtual atoms. In some embodiments, the discretization of the volume fractions is coupled with the discretization of the flux.

3. Flux calculation by the Direct Simulation Monte-Carlo (DSMC) method that optionally uses a voxel traversal technique. Some embodiments described herein use a computationally efficient technique to calculate the plasma-generated particle fluxes on arbitrary points of the processed wafer surface. In terms of the amount of computation required, flux calculations are usually the most expensive part of feature-scale topography simulation. An important feature of embodiments disclosed herein is to transport discrete flux quanta (particles) through a uniform 3D Cartesian grid from a source above the wafer to the wafer surface by means of a computationally efficient technique, e.g., a software implementation of the voxel traversal algorithm. Further details of the voxel traversal algorithm can be found in John Amanatides and Andrew Woo, "A fast voxel traversal algorithm for ray tracing," *Eurographics*. Vol. 87. No. 3. 1987, which is herein incorporated by reference. Some embodiments described herein can perform flux calculations by 2-3 orders of magnitude faster than existing techniques.

4. Coupled discretization of reactant fluxes and volume fractions of the structure representation. Some embodiments afford a natural balancing of different discretization errors by coupling the discretization of the volume fractions with the discretization of the flux. In other words, some embodiments couple the number of flux samples with the number of atoms in a cell of the voxel grid. This feature is an important, novel, and non-obvious insight that enables embodiments described herein to achieve a high computational performance.

5. Suppression of surface roughness. Some embodiments described herein use one or more smoothing techniques to solve the problem of unphysical surface roughness during Monte-Carlo simulation of etching or deposition. The surface roughness is caused by the stochastic nature of the Monte-Carlo technique which is used for flux calculation. Three different methods are described below for suppressing the surface roughness.

6. Failure-tolerant lock-free parallelization. Typically, parallel threads obtain a lock on a shared data structure before modifying the data structure. In contrast, some embodiments described herein use a non-obvious lock-free parallelization method for shared-memory architectures. This important, novel, and non-obvious feature enables embodiments described herein to achieve high parallel speedup on multi-core computers.

Fast Physics-Based Topography Simulation

Figure 1:
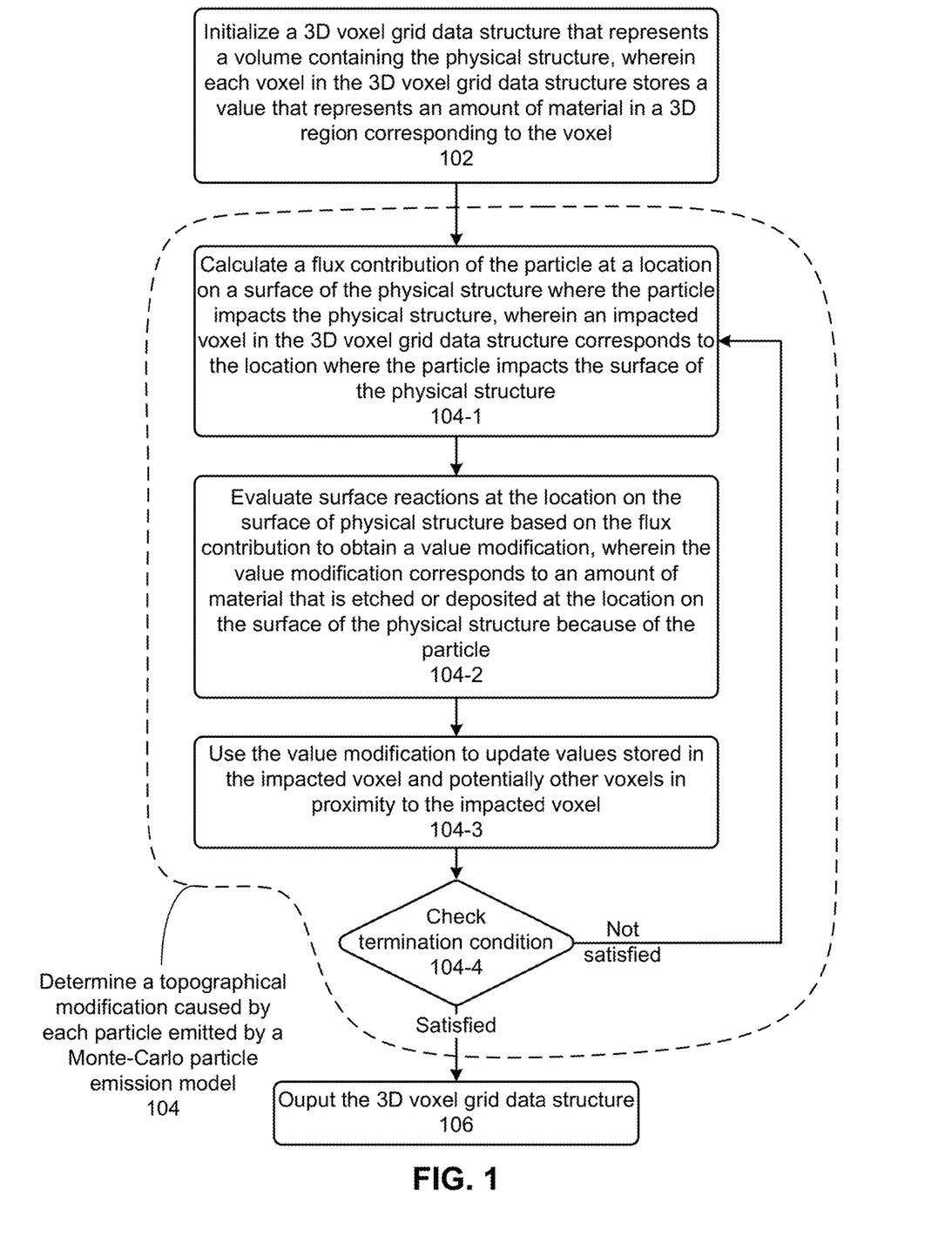
FIG. 1 illustrates a topography simulation process in accordance with some embodiments described herein.

FIG. 1 illustrates a topography simulation process in accordance with some embodiments described herein. The process can begin by initializing the structure and the model parameters. Specifically, the process can begin by initializing a 3D voxel grid data structure that represents a volume containing the physical structure, wherein each voxel in the 3D voxel grid data structure stores a value that represents an amount of material in a 3D region corresponding to the voxel. In some embodiments, each voxel in the 3D voxel grid data structure stores an integer value (operation 102). Details of how voxels can be used to represent 3D physical structures can be found in many texts, e.g., see Pharr, Matt, and Greg Humphreys, "*Physically based rendering: From theory to implementation,*" Morgan Kaufmann, 2004, which is herein incorporated by reference.

A Monte-Carlo particle emission model can be used to simulate the behavior of a particle source that emits particles that are, for example, used in an etching or deposition process. The Monte-Carlo particle emission model can simulate the effect of a single particle by emitting multiple particles that have velocities (note that each particle velocity is a vector quantity, i.e., it specifies both the speed and the direction of the particle) that are randomly selected based on a particle velocity probability distribution that characterizes the particle source. In some embodiments, the Monte-Carlo particle emission model models a plasma source that is used for plasma-assisted etching or deposition in a semiconductor manufacturing process.

The process can then simulate the topographical modification caused by each particle that is emitted by the Monte-Carlo particle emission model (operation 104). Note that operation 104 is illustrated in FIG. 1 by a dashed outline. Operation 104 is a novel and non-obvious feature. Existing simulation techniques typically do not simulate the effect of each particle. Instead, existing simulation techniques compute a flux distribution on the wafer's surface based on the particle source, and then use the flux distribution as an input to the surface reaction model, thereby determining the resulting topography of the wafer's surface. In contrast to existing techniques, the process can perform at least three operations for each particle that is emitted by the Monte-Carlo particle emission model. These three operations are described in the following paragraphs.

First, the process can calculate a flux contribution of the particle at a location on a surface of the physical structure where the particle impacts the physical structure, wherein an impacted voxel in the 3D voxel grid data structure corresponds to the location where the particle impacts the surface of the physical structure (operation 104-1). In other words, the reactant fluxes can be calculated at each exposed surface cell of the simulation grid. In some embodiments, each flux is treated as a number of discrete flux quanta which are related to the number of reactive atoms or molecules that are emitted by the plasma and that eventually reach the wafer surface. Details of Monte-Carlo particle emission models and flux calculations can be found in many texts, e.g., see Haghighat, Alireza, "*Monte Carlo Methods for Particle Transport,*" CRC Press, 2016, which is herein incorporated by reference.

Some embodiments described herein calculate the flux contribution of the particle by using a novel and non-obvious method that uses a voxel traversal technique to determine the location on the surface of the physical structure where the particle impacts the physical structure.

Second, the process can evaluate surface reactions at the location on the surface of physical structure based on the flux contribution to obtain a value modification, wherein the value modification corresponds to an amount of material that is etched or deposited at the location on the surface of the physical structure because of the particle (operation 104-2). The surface reactions can be specified according to user-defined models. The results of operation 104-2 are the amounts of deposited or etched material, and the reaction products which leave the surface and can react on other parts of the wafer surface. The actual surface reactions that are evaluated depend on the particular etching or deposition process that is being simulated. Numerous techniques for modeling and evaluating surface reactions can be found in the literature. For example, see (1) Donnelly, Vincent M., and Avinoam Kornblit, "Plasma etching: Yesterday, today, and tomorrow," *Journal of Vacuum Science & Technology A* 31.5 (2013): 050825, (2) Belen, Rodolfo Jun, et al. "Feature-scale model of Si etching in SF6/O2 plasma and comparison with experiments." *Journal of Vacuum Science & Technology A* 23.5 (2005): 1430-1439, and (3) Zhang, Da, and Mark J. Kushner. "Investigations of surface reactions during C2F6 plasma etching of SiO2 with equipment and feature scale models." *Journal of Vacuum Science and Technology-Section A*—Vacuum Surfaces and Films 19.2 (2001): 524-538, which are herein incorporated by reference.

Third, the process can use the value modification to update values stored in the impacted voxel and potentially other voxels in proximity to the impacted voxel (operation 104-3). In other words, the process can modify the structure by incrementing or decrementing the volume fractions that represent the amount of material in each cell of the grid. In some embodiments, if the value modification causes the value of a voxel to decrease beyond a lower bound (e.g., "0" if the voxel value is an integer) or increase beyond an upper bound (e.g., "$2^b-1$" if the voxel value is a b-bit integer), then the process can modify the value of other voxels in proximity to the impacted voxel so that the entire value modification is applied (i.e., the portion of the value modification that could not be applied to the impacted voxel because of the lower or upper bounds is applied to other voxels in proximity to the impacted voxel).

Smoothing methods can be used at this point to avoid unphysical surface roughness (some smoothing methods redistribute material among neighboring voxels to suppress roughness). If smoothing methods are used, then they can be performed as part of operation 104-3. The process can then check a termination condition (operation 104-4) to determine whether or not a user-defined termination condition has been satisfied (e.g., whether or not a predetermine amount of simulation time has elapsed). If the termination condition is satisfied, then the process can output the 3D voxel grid data structure (operation 106), which can then be rendered to display the resulting wafer topography on a display screen. Otherwise, the process can return to operation 104-1 and process the next particle emitted by the Monte-Carlo particle emission model. In some embodiments, the process can continuously or periodically render the 3D voxel grid data structure so that the topography modifications are displayed on the display screen as they evolve over time. The following paragraphs describe further implementation details, variations, and/or modifications of the topography simulation process illustrated in FIG. 1.

Voxel Grid Data Structure

Figure 2:
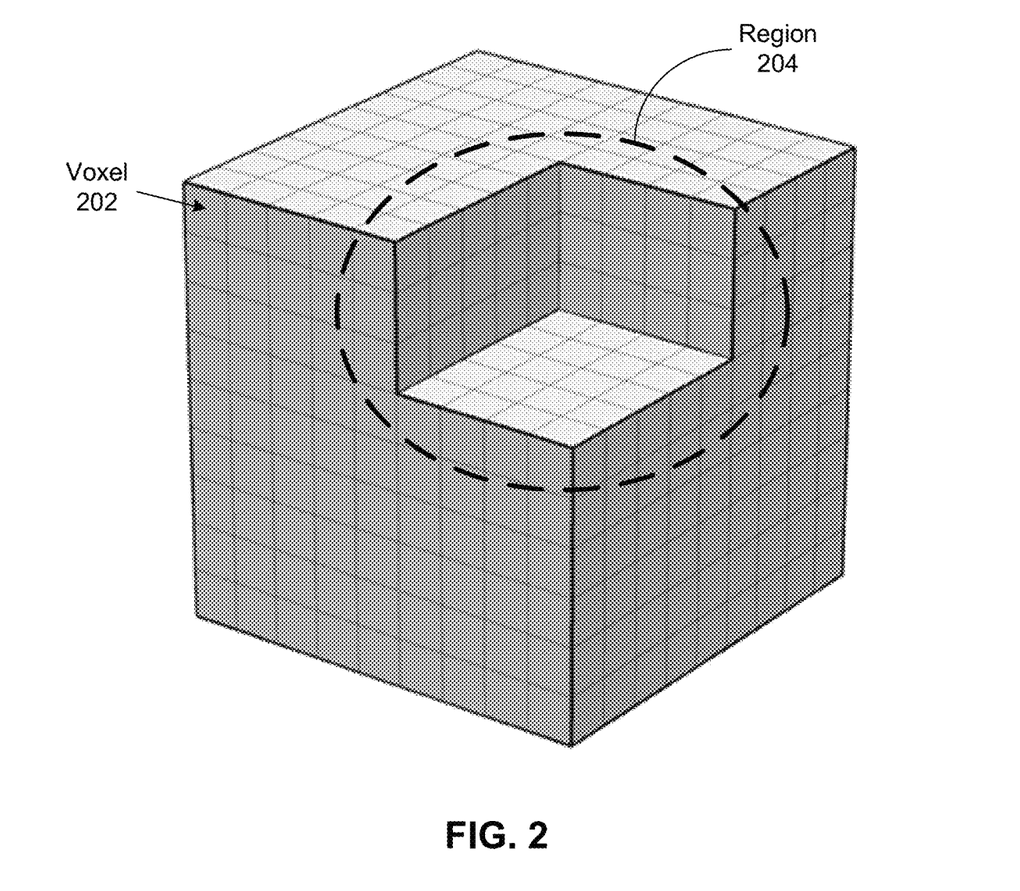
FIG. 2 illustrates a 3D voxel grid in accordance with some embodiments described herein.

FIG. 2 illustrates a 3D voxel grid in accordance with some embodiments described herein. The 3D voxel grid illustrated in FIG. 2 represents a cubic physical structure in which material from one of the corners has been removed (the corner from which material has been removed is located in region 204). Each unit cube corresponds to a voxel, e.g., voxel 202 corresponds to a unit cube at one of the corners of the cubic physical structure. Voxel 202 is completely filled with material and is illustrated in FIG. 2 as a solid unit cube. On the other hand, region 204 where material was removed has voxels that are empty and are illustrated in FIG. 2 as space. The 3D voxel grid data structure is used both for storing and modifying structural information, and for calculating flux transport in gaseous regions of space. The use of a single data structure that supports fast computation is essential for the robustness and speed of the simulator.

Discrete Volume-Of-Fluid (VoF) Technique

The VoF method is used in computational fluid dynamics and is known for its robustness and efficiency. In some embodiments described herein, the volume fractions are represented by integers which represent discrete particles, or virtual atoms. Because the volume fractions are represented by integers, the basic operations for etching and/or deposition are computationally cheap. The fact that the basic operations on the volume fractions are computationally cheap is important for ensuring the correctness and scalability of the lock-free parallelization implementation described below.

Flux Calculation by the Direct Simulation Monte-Carlo (DSMC)

In some embodiments, a DSMC technique in combination with a voxel traversal technique is used to simulate the transport of flux quanta, or flux particles, through the gaseous space regions of the simulation grid. Flux particles are either emitted by a source which models the plasma-generated fluxes, or they are emitted as reaction products from the wafer surface. The voxel traversal technique moves particles one cell at a time and checks for collision with the wafer surface at each step. Some advantages of calculating fluxes in this manner include robustness, low computational cost, and suitability for parallelization.

Coupled Discretization of Reactant Fluxes and Volume Fractions

In some embodiments, the number of virtual atoms in a full cell is related to the flux quantization in such a way that one flux quantum corresponds to one virtual atom. By increasing the number of virtual atoms in a cell, the number of flux quanta can be increased proportionally so that the etch and deposition rates stay the same, but the statistical variance decreases. The parameters of this method can be adjusted to achieve realistic physical conditions in the sense that one virtual atom corresponds to one real atom. This technique thus suggests a natural upper limit to the number of particles that is reasonably used for a simulation.

Suppression of Surface Roughness

Figure 3:
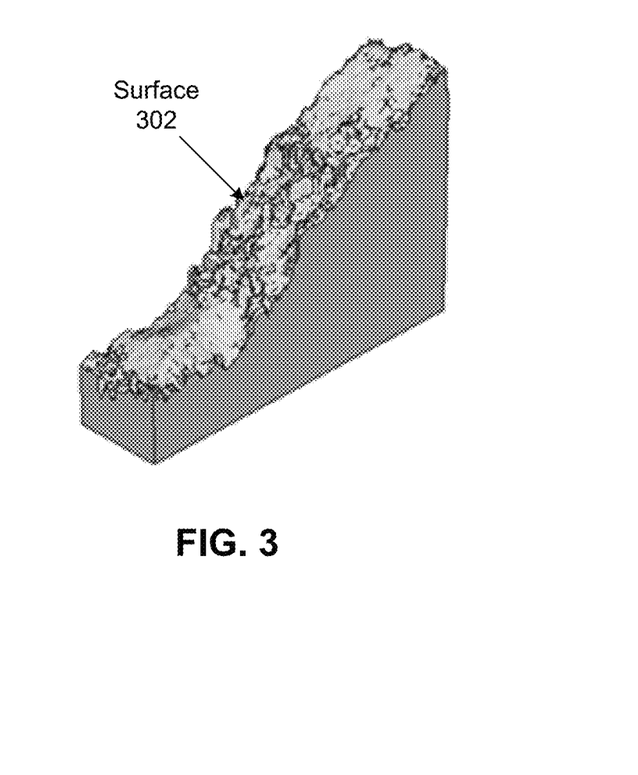
FIG. 3 illustrates a rough surface that can occur due to the stochastic nature of the Monte-Carlo method in accordance with some embodiments described herein.

The stochastic nature of the Monte-Carlo method that is used for flux calculation can cause the surface of the structure (e.g., the wafer surface) to be rough. FIG. 3 illustrates rough surface 302 that can occur due to the stochastic nature of the Monte-Carlo method in accordance with some embodiments described herein. However, the surface of the actual physical structure is usually not rough. Therefore, some embodiments described herein use surface smoothing techniques to ensure that the surface generated by the simulation matches the actual surface that one expects to have after etching or deposition. Specifically, three methods are presented below for solving the problem of unphysical surface roughness during Monte-Carlo simulation of etching or deposition. These methods have different properties which make them more or less suitable for different types of etching and/or deposition. These methods have been presented for illustrative purposes only, and are not intended to limit the scope of the disclosure to these three methods.

In the first method, the surface roughness problem is solved by using a variance reduction technique which is inspired by the known technique of antithetic variates. Ultimately, the solution works by emitting source particles in a partially ordered way rather than completely randomly. The main idea is to introduce some order into the random Monte-Carlo particle emission algorithm, while maintaining the statistical distributions of the emission model. Instead of emitting particles from random locations and into random directions, the particles are emitted in chunks with ordered locations and directions.

Figure 4:
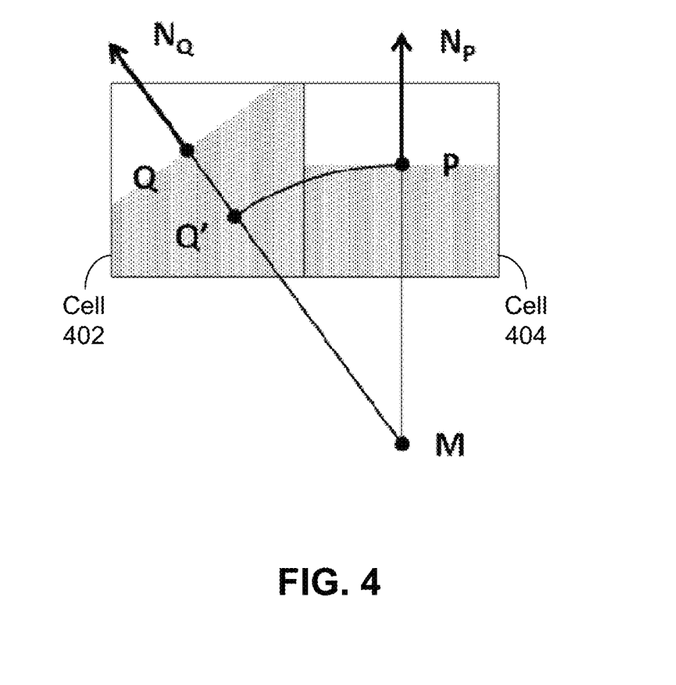
FIG. 4 illustrates the geometrical construction for calculating the difference between the surface patch and the actual surface for two adjacent cells of the 3D voxel grid in accordance with some embodiments described herein.

In the second method, the surface roughness problem is solved by using a local smoothing technique which selects the optimal cell from a set of adjacent cells of the simulation grid for adding or removing a particle. The main idea is to use a local approximation of the wafer surface to discriminate and attenuate stochastic roughness. The local surface approximation models a smooth second-order surface patch. Differences between the surface patch and the actual surface are considered to be random fluctuations that are to be minimized by selecting the best cell for adding or removing a particle. FIG. 4 illustrates the geometrical construction for calculating the difference between the surface patch and the actual surface for two adjacent cells 402 and 404 of the 3D voxel grid in accordance with some embodiments described herein. The actual surface points P and Q, and the corresponding surface normals $N_P$ and $N_Q$ are used to calculate the local center of curvature M and the approximated point of the smooth surface patch Q'. The difference between Q and Q' is the deviation between the actual surface and the idealized smooth surface.

Figure 5:
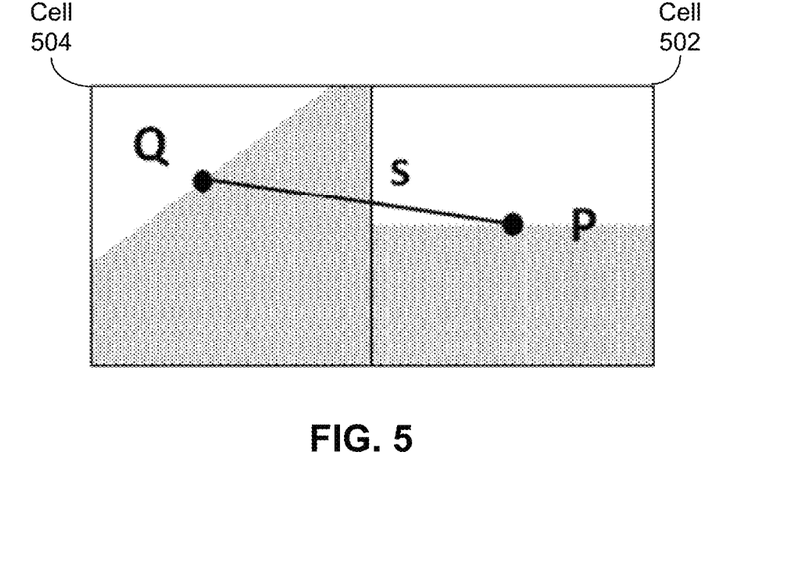
FIG. 5 illustrates the geometrical construction in two dimensions for use in the local smoothing technique in accordance with some embodiments described herein.

In the third method, the surface roughness problem is solved by using a local smoothing technique which selects the optimal cell from a set of adjacent cells of the simulation grid for adding or removing a particle. The main idea is that roughness increases the area of a surface, and consequently, roughness can be reduced by minimizing the surface area. This method optimizes the process of adding or removing a particle in such a way that the surface area is minimized. FIG. 5 illustrates the geometrical construction in two dimensions for use in the local smoothing technique in accordance with some embodiments described herein. This method attempts to minimize the square of the distance "s" between the two surface points P and Q in adjacent cells 502 and 504, respectively.

Figure 6:
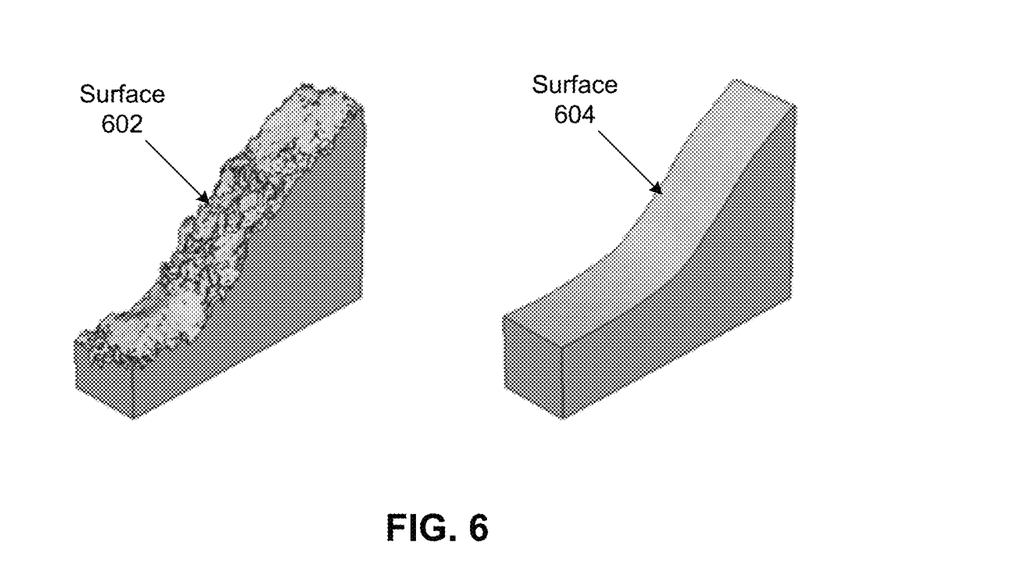
FIG. 6 illustrates a surface with and without using suppression of surface roughness in accordance with some embodiments described herein.

In some embodiments, the second method for suppressing roughness can be used for etching, and the third method for suppressing roughness can be used for deposition. In some embodiments, the first method for suppressing roughness can be used for cases where particles are emitted only from the plasma source, and not from the wafer surface. For example, the first method can be used for cases that involve pure sputter etching without re-deposition of sputtered material. FIG. 6 illustrates a surface with and without using suppression of surface roughness in accordance with some embodiments described herein. Surface 602 illustrates the result when roughness suppression is not used, and surface 604 illustrates the result when a roughness suppression technique is used.

Failure-Tolerant Lock-Free Parallelization

Usually, when multiple threads share a data structure, a lock on the data structure must be obtained before modifying the data structure. Obtaining a lock ensures that the data structure is modified in a correct manner. However, obtaining a lock on a shared data structure can reduce the amount of speedup that can be obtained by parallelization because of threads that are waiting for other threads to complete their modifications to the data structure. Not locking the shared data structure can lead to race conditions. A novel and non-obvious feature of the parallelization method described herein is that any race conditions that are caused by a lock-free sharing of the 3D voxel grid data structure are tolerated and their effect is minimized. In some embodiments, undefined behavior is avoided by using a non-dynamic data structure. Remaining errors due to race conditions are considered to be tolerable if their effect is smaller than the statistical variance of the Monte-Carlo simulation. Experimental verification demonstrates the validity of this approach.

Figure 7:
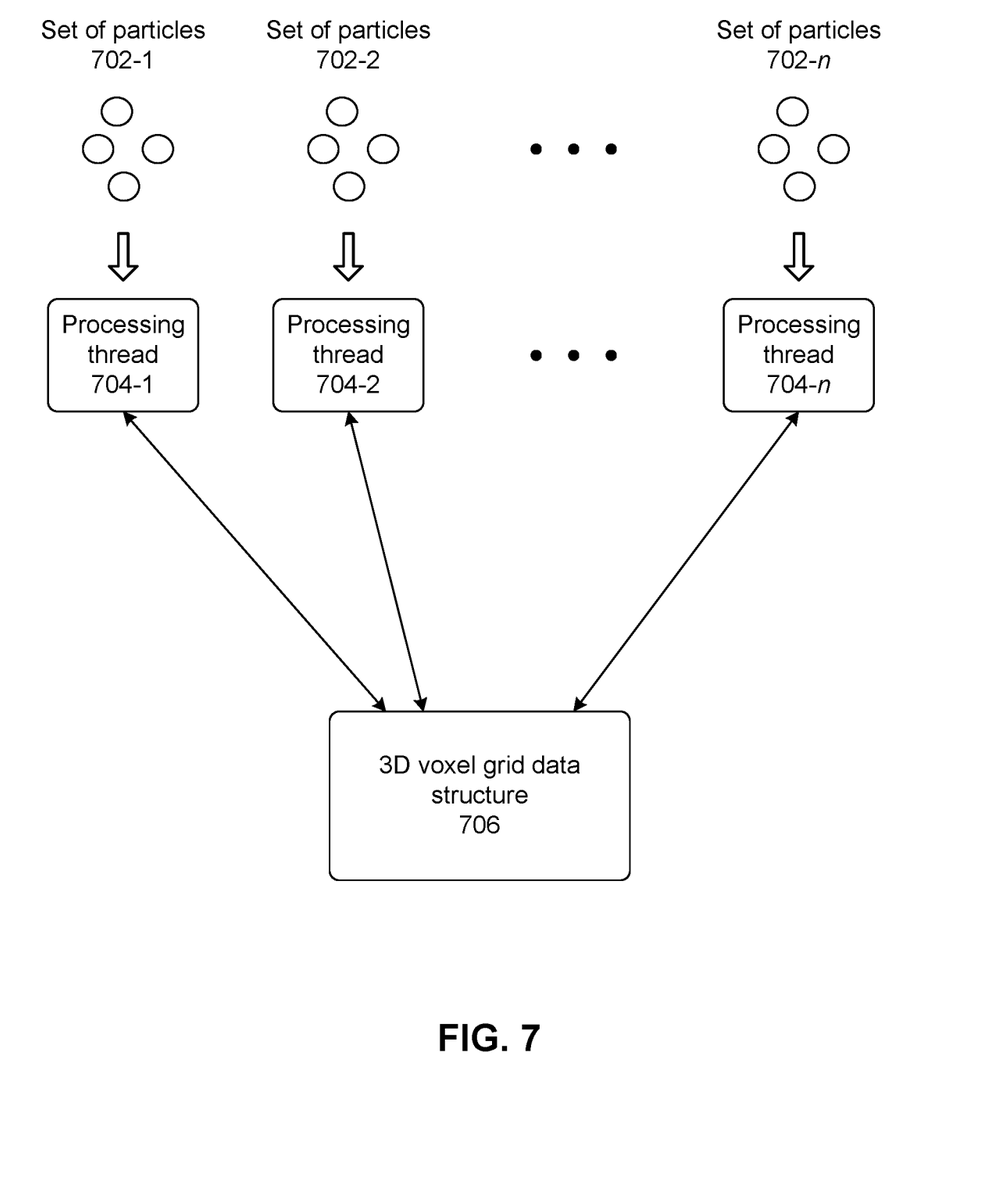
FIG. 7 illustrates how the topography simulation can be parallelized in accordance with some embodiments described herein.

FIG. 7 illustrates how the topography simulation can be parallelized in accordance with some embodiments described herein. Each processing thread can simulate the effect of a set of particles. All processing threads share a common 3D voxel grid data structure and modify the data structure without obtaining locks. For example, set of particles 702-1, 702-2, . . . , and 702-n can be simulated by processing threads 704-1, 704-2, . . . , and 704-n, respectively. Each processing thread can access (i.e., read and write) 3D voxel grid data structure 706 without obtaining locks. Each processing core in the computer can execute one or more processing threads.

In some embodiments, the parallelization method assigns an equal number of source flux particles to each computational thread. The chain of events which follows from the emission of a source particle is handled by the thread which emits the source particle. This chain of events includes all secondary particles which are generated as reaction products. As shown in FIG. 7, all threads access the same 3D voxel grid data structure, which can lead to race conditions. However, as explained above and as verified via experimentation, the race conditions do not result in an incorrect topography simulation.

Figure 8:
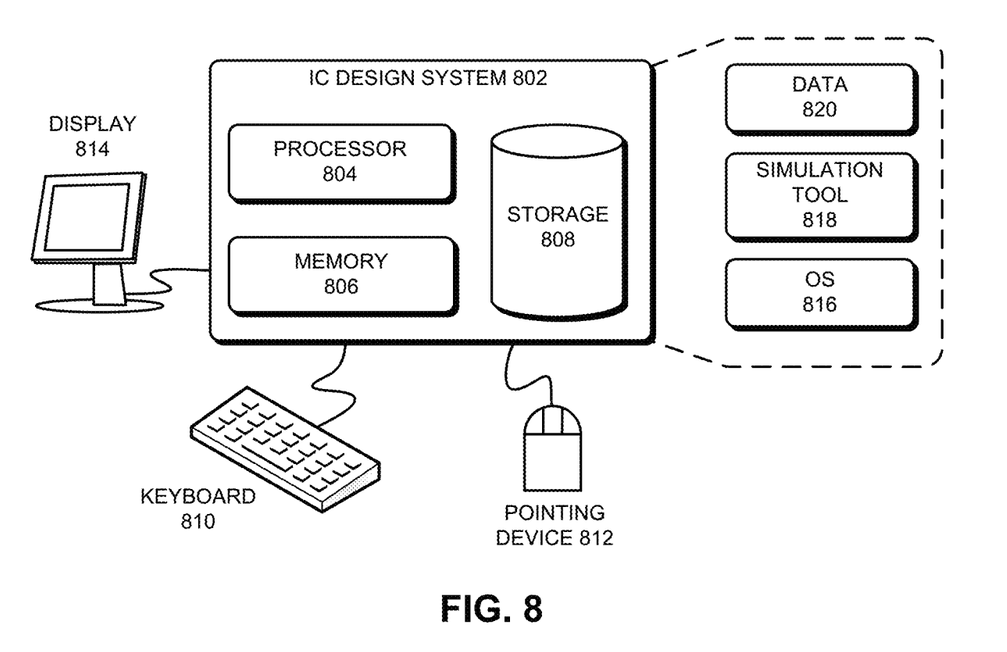
FIG. 8 illustrates an IC design system in accordance with some embodiments described herein.

The term "IC design system" generally refers to a hardware based system that is used in an overall IC design and manufacturing process. Specifically, an IC design system facilitates the design of ICs, so that the ICs can be subsequently manufactured at a semiconductor fabrication facility. FIG. 8 illustrates an IC design system in accordance with some embodiments described herein. IC design system 802 (which can also be referred to as a simulation system when IC design system 802 is used for topography simulation) can include processor 804, memory 806, and storage device 808. Processor 804 generally refers to any mechanism that is capable of performing computations. For example, processor 804 can be a single processing chip that includes multiple processing cores. Alternatively, processor 804 can be multiple separate processor chips that access a shared memory. Specifically, memory locations in memory 806 can be addressable by processor 804, thereby enabling processor 804 to access (e.g., via load/store instructions) and manipulate (e.g., via logical/floating point/arithmetic instructions) the data stored in memory 806. IC design system 802 can be coupled to display device 814, keyboard 810, and pointing device 812. Storage device 808 can store operating system 816, simulation tool 818, and data 820. Data 820 can include input required by simulation tool 818 and/or output generated by simulation tool 818.

IC design system 802 may automatically (or with user help) perform one or more operations that are implicitly or explicitly described in this disclosure. Specifically, IC design system 802 can load simulation tool 818 into memory 806, and simulation tool 818 can then be used to perform topography simulation of etching and/or deposition on a physical structure. Next, simulation tool 818 (or another tool that is stored in storage 808) can be used to determine whether or not an IC chip will be manufactured with the desired features and performance characteristics. If the IC chip is expected to be manufactured as desired, the overall IC design and manufacturing process can proceed to the next step. Otherwise, the overall IC design and manufacturing process can return to a previous step in which the IC design or the semiconductor manufacturing process can be modified.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method for topography simulation of etching and/or deposition on a physical structure, the method comprising:
   initializing a three-dimensional (3D) voxel grid data structure that represents a volume containing the physical structure, wherein each voxel in the 3D voxel grid data structure stores a value that represents an amount of material in a 3D region corresponding to the voxel;
   for each particle emitted by a Monte-Carlo particle emission model, performing a set of operations to determine a topographical modification caused by the particle, wherein the set of operations comprises:
      calculating a flux contribution of the particle at a location where the particle impacts a surface of the physical structure, wherein an impacted voxel in the 3D voxel grid data structure corresponds to the location;
      evaluating surface reactions at the location based on the flux contribution to obtain a value modification, wherein the value modification corresponds to an amount of material that is etched or deposited at the location by the particle; and
      using the value modification to update values stored in at least the impacted voxel; and
   wherein the topography simulation is performed by using multiple threads that execute in parallel, wherein each thread performs the set of operations for a subset of particles emitted by the Monte-Carlo particle emission model, wherein the multiple threads use lock-free sharing to share the 3D voxel grid data structure, and wherein errors due to race conditions caused by the lock-free sharing are considered to be tolerable when an effect of the errors is smaller than a statistical variance caused by using the Monte-Carlo particle emission model.

2. The non-transitory computer-readable storage medium of claim 1, wherein each voxel in the 3D voxel grid data structure stores an integer value.

3. The non-transitory computer-readable storage medium of claim 1, wherein calculating the flux contribution of the particle comprises using a voxel traversal technique to determine the location on the surface of the physical structure where the particle impacts the physical structure.

4. The non-transitory computer-readable storage medium of claim 1, wherein the method further comprises displaying an image of the physical structure on a screen by rendering the 3D voxel grid data structure.

5. An integrated circuit (IC) design system, comprising:
   a processor; and
   a non-transitory computer-readable storage medium storing instructions that, when executed by the processor, cause the IC design system to perform a method for topography simulation of etching and/or deposition on a physical structure, the method comprising:
      initializing a three-dimensional (3D) voxel grid data structure that represents a volume containing the physical structure, wherein each voxel in the 3D voxel grid data structure stores a value that represents an amount of material in a 3D region corresponding to the voxel;
      for each particle emitted by a Monte-Carlo particle emission model, performing a set of operations to determine a topographical modification caused by the particle, wherein the set of operations comprises:
         calculating a flux contribution of the particle at a location where the particle impacts a surface of the physical structure, wherein an impacted voxel in the 3D voxel grid data structure corresponds to the location;
         evaluating surface reactions at the location based on the flux contribution to obtain a value modification, wherein the value modification corresponds to an amount of material that is etched or deposited at the location by the particle; and
         using the value modification to update values stored in at least the impacted voxel; and
      wherein the topography simulation is performed by using multiple threads that execute in parallel, wherein each thread performs the set of operations for a subset of particles emitted by the Monte-Carlo particle emission model, wherein the multiple threads use lock-free sharing to share the 3D voxel grid data structure, and wherein errors due to race conditions caused by the lock-free sharing are considered to be tolerable when an effect of the errors is smaller than a statistical variance caused by using the Monte-Carlo particle emission model.

6. The IC design system of claim 5, wherein each voxel in the 3D voxel grid data structure stores an integer value.

7. The IC design system of claim 5, wherein calculating the flux contribution of the particle comprises using a voxel traversal technique to determine the location on the surface of the physical structure where the particle impacts the physical structure.

8. The IC design system of claim 5, wherein the non-transitory computer-readable storage medium additionally storing instructions that, when executed by the processor, cause the IC design system to display an image of the physical structure on a screen by rendering the 3D voxel grid data structure.

9. A method for topography simulation of etching and/or deposition on a physical structure, the method comprising:
   initializing a three-dimensional (3D) voxel grid data structure that represents a volume containing the physical structure, wherein each voxel in the 3D voxel grid data structure stores a value that represents an amount of material in a 3D region corresponding to the voxel;
   for each particle emitted by a Monte-Carlo particle emission model, performing a set of operations to determine a topographical modification caused by the particle, wherein the set of operations comprises:
      calculating a flux contribution of the particle at a location where the particle impacts a surface of the physical structure, wherein an impacted voxel in the 3D voxel grid data structure corresponds to the location;
      evaluating surface reactions at the location based on the flux contribution to obtain a value modification, wherein the value modification corresponds to an amount of material that is etched or deposited at the location by the particle; and
      using the value modification to update values stored in at least the impacted voxel; and wherein the topography simulation is performed by using multiple threads that execute in parallel, wherein each thread performs the set of operations for a subset of particles emitted by the Monte-Carlo particle emission model, wherein the multiple threads use lock-free sharing to share the 3D voxel grid data structure, and wherein errors due to race conditions caused by the lock-free sharing are considered to be tolerable when an effect of the errors is smaller than a statistical variance caused by using the Monte-Carlo particle emission model.

10. The method of claim 9, wherein each voxel in the 3D voxel grid data structure stores an integer value.

11. The method of claim 9, wherein calculating the flux contribution of the particle comprises using a voxel traversal technique to determine the location on the surface of the physical structure where the particle impacts the physical structure.

12. The method of claim 9, wherein the method further comprises displaying an image of the physical structure on a screen by rendering the 3D voxel grid data structure.

\* \* \* \* \*